(12) United States Patent
Brooks et al.

(10) Patent No.: US 11,287,232 B2
(45) Date of Patent: Mar. 29, 2022

(54) ADDITIVELY MANUFACTURED SELF-DESTRUCTIVE DELAY DEVICE

(71) Applicant: BAE SYSTEMS Information and Electronic Systems Integration Inc., Nashua, NH (US)

(72) Inventors: Eric N. Brooks, Nashua, NH (US); William R. Samuels, Wilton, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 116 days.

(21) Appl. No.: 16/712,095

(22) Filed: Dec. 12, 2019

(65) Prior Publication Data

US 2021/0180925 A1   Jun. 17, 2021

(51) Int. Cl.
*F42B 10/14* (2006.01)
*B33Y 80/00* (2015.01)

(52) U.S. Cl.
CPC .............. *F42B 10/14* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 2,485,949 A | * | 10/1949 | Wilson | F42C 9/045 |
| | | | | 102/257 |
| 2,555,318 A | * | 6/1951 | Christensen | F42C 7/04 |
| | | | | 102/428 |
| 2,701,963 A | * | 2/1955 | Balleisen | F41A 25/10 |
| | | | | 73/167 |
| 2,923,089 A | * | 2/1960 | Fissel | F42B 15/36 |
| | | | | 446/231 |
| 3,134,330 A | | 5/1964 | Batou | |
| 3,882,776 A | * | 5/1975 | Clemens | F42C 7/04 |
| | | | | 102/429 |
| 3,994,230 A | | 11/1976 | Kalin | |

(Continued)

FOREIGN PATENT DOCUMENTS

WO        2006/111719 A1    10/2006
WO     WO-2017207538 A1 * 12/2017 ............. F16F 13/00

OTHER PUBLICATIONS

Machine Translation of WO-2017/207538-A1 (Year: 2017).*

(Continued)

*Primary Examiner* — Jacob J Cigna
(74) *Attorney, Agent, or Firm* — KPIP Law, PLLC; Gary McFaline

(57) ABSTRACT

The system and method for an additively manufactured self-destructive delay device is a bellow/lattice structure or other form. The device may be installed as a replacement to a previous device, where the device yields under the deployment force at a specific rate to match the time-displacement curve established by a previous hydraulic delay device. The delay device has a virtually unlimited lifespan, is cheap to manufacture, and can be adaptable to other loads and conditions for use in or on other platforms. This solution can be applied anywhere where mechanical delay devices are needed within systems. Some examples include wing/fin deployment mechanisms, safety crumple zones, or devices that act as shear pins.

19 Claims, 15 Drawing Sheets

(56) References Cited

U.S. PATENT DOCUMENTS

| | | | |
|---|---|---|---|
| 4,029,016 A * | 6/1977 | Cole | F42C 9/00 |
| | | | 102/489 |
| 4,047,484 A * | 9/1977 | Cole | F42C 15/184 |
| | | | 102/256 |
| 4,553,482 A | 11/1985 | Weber et al. | |
| 4,729,316 A | 3/1988 | Evrard et al. | |
| 5,410,833 A * | 5/1995 | Paterson | F41C 23/06 |
| | | | 42/73 |
| 7,628,353 B2 | 12/2009 | Peterson | |
| 8,413,582 B1 * | 4/2013 | Chen | F42C 15/20 |
| | | | 102/232 |
| 8,522,685 B1 | 9/2013 | Gold et al. | |
| 2003/0167956 A1 | 9/2003 | Kellner | |
| 2003/0183111 A1 | 10/2003 | Tasson | |
| 2007/0089598 A1 | 4/2007 | Courty | |
| 2008/0230477 A1 * | 9/2008 | Mihaylov | C02F 1/441 |
| | | | 210/652 |
| 2009/0235838 A1 * | 9/2009 | Hultman | F42C 9/142 |
| | | | 102/335 |
| 2010/0282118 A1 | 11/2010 | Lady Jensky et al. | |
| 2020/0023584 A1 * | 1/2020 | Portela | B29C 64/30 |
| 2020/0363181 A1 * | 11/2020 | Shaw | B33Y 80/00 |
| 2021/0116947 A1 * | 4/2021 | Czechowski | G05D 16/10 |

OTHER PUBLICATIONS https://en.wikipedia.org/w/index.php?title=Belleville_washer&oldid=928204158, known at least as early as Oct. 29, 2019.

International Search Report, PCT/US2020/063762, 6 pages, dated Mar. 10, 2021.

* cited by examiner

CALCULATION COEFFICIENT $\alpha$ $$\alpha = \frac{1}{\pi} \cdot \frac{\left(\frac{\delta-1}{\delta}\right)^2}{\frac{\delta+1}{\delta-1} - \frac{2}{\ln\delta}}$$

FIG.3B

CALCULATION COEFFICIENT $\beta$ $$\beta = \frac{1}{\pi} \cdot \frac{6}{\ln\delta} \left(\frac{\delta-1}{\ln\delta} - 1\right)$$

FIG.3C

CALCULATION COEFFICIENT $\gamma$ $$\gamma = \frac{\delta-1}{\pi} \cdot \frac{3}{\ln\delta}$$

FIG.3D

FORCE AT MAXIMUM SPRING DEFLECTION AND LIMIT DEFLECTION:

$$F_{MAX} = \frac{4E \cdot t^3 \cdot S_m}{(1-\mu^2) \cdot \alpha \cdot D^2} \quad [N, lb]$$

WHERE:

$E$ = SPRING MODULUS OF ELASTICITY [MPa, psi]
$t$ = SPRING MATERIAL THICKNESS [mm, in]
$S_m$ = LIMIT SPRING DEFLECTION [mm, in]
$\mu$ = POISSON'S RATIO
$\alpha$ = CALCULATION COEFFICIENT
$D$ = OUTSIDE SPRING DIAMETER [mm, in]

FIG.3E

FORCE EXERTED BY THE SPRING AT s DEFLECTION:

$$F = \frac{4E \cdot t^4}{(1-\mu^2)\cdot \alpha \cdot D^2} \cdot \frac{s}{t} \cdot \left[\left(\frac{h}{t}-\frac{s}{t}\right)\cdot\left(\frac{h}{t}-\frac{s}{2t}\right)+1\right] \quad [N,lb]$$

WHERE:
E=SPRING MODULUS OF ELASTICITY [MPa,psi]
t=SPRING MATERIAL THICKNESS [mm,in]
s=WORKING DEFLECTION OF A SPRING [mm,in]
$\mu$=POISSON'S RATIO
$\alpha$=CALCULATION COEFFICIENT
D=OUTSIDE SPRING DIAMETER [mm,in]
h=UNLOADED HEIGHT OF TRUNCATED CONE OF FREE SPRING [mm,in]

FIG.3F

MAXIMUM PRESSURE STRESS IN SPRING AT s DEFLECTION:

$$\sigma = \frac{4E \cdot t \cdot s}{(1-\mu^2) \cdot \alpha \cdot D^2} \cdot \left[\beta \cdot \left(\frac{h}{t} - \frac{s}{2t}\right) + \gamma\right] \quad [\text{MPa,psi}]$$

WHERE:
E = SPRING MODULUS OF ELASTICITY [MPa,psi]
t = SPRING MATERIAL THICKNESS [mm,in]
s = WORKING DEFLECTION OF A SPRING [mm,in]
$\mu$ = POISSON'S RATIO
$\alpha$ = CALCULATION COEFFICIENT
D = OUTSIDE SPRING DIAMETER [mm,in]
$\beta$ = CALCULATION COEFFICIENT
h = UNLOADED HEIGHT OF TRUNCATED CONE OF FREE SPRING [mm,in]
$\gamma$ = CALCULATION COEFFICIENT

FIG.3G

ADDITIVELY MANUFACTURED SELF-DESTRUCTIVE DELAY DEVICE

FIELD OF THE DISCLOSURE

The present disclosure relates to delay devices and more particularly to self-destructive delay devices that are inexpensive and have a long shelf life.

BACKGROUND OF THE DISCLOSURE

In the area of munitions, delay devices allow for a set time delay before an action such as deploying fins or initiating the fuse have existed for many years and varied implementations. For example, one delay device was a simple hydraulic piston that, upon engagement, would provide a time delay to a mechanical action. This had been previously achieved by a constant-force spring depressing a lever arm into the piston over a specific displacement; where the piston stroke would slow the movement of the lever arm to delay the mechanism for a predetermined amount of time. One exemplary application would be in fin deployment for a projectile.

However, the hydraulic fluid contained in these prior systems' pistons limit the shelf life of the top level system. The hydraulic fluid contained within the piston has a much shorter shelf life than the rest of the components in the system. The delay unit itself cannot be removed and replaced once the shelf life for that delay device has expired; it is installed early on in the assembly process and any attempt to disassemble the system to replace the piston would destroy the system. As a result, once the hydraulic fluid in the delay device reaches the end of its shelf life, the entire system needs to be recalled, scrapped, rebuilt, and replaced at great cost. In such a situation, one simple part limits an entire system's lifespan that would have otherwise lasted for a much longer period of time.

Wherefore it is an object of the present disclosure to overcome the above-mentioned shortcomings and drawbacks associated with conventional delay devices.

SUMMARY OF THE DISCLOSURE

One aspect of the present disclosure is an additively manufactured self-destructive delay device, comprising: a plurality of cells, wherein the cells have a cell type and the plurality of cells are configured to fit within a form factor; a displacement; a time delay; and a force under which the delay device will yield at the time delay.

One embodiment of the additively manufactured self-destructive delay device is wherein a cell type is one of a lattice cell, an arrow cell, a radial cell, a torsion cell, or a bellow cell. In some cases, the form factor is a cylinder or a rectangle.

Another embodiment of the additively manufactured self-destructive delay device is wherein the displacement is radial. In certain embodiments, the displacement is greater than an inch. In some cases, the displacement is less than an inch.

In certain embodiments of the additively manufactured self-destructive delay device, the time delay is less than one second.

In still yet another embodiment of the additively manufactured self-destructive delay device, the force is less than 10 lbf. In some embodiments, the force is greater than 50 lbf.

Yet another embodiment of the additively manufactured self-destructive delay device is wherein the displacement is linear. In some embodiments, the displacement is greater than an inch. In certain cases, the displacement is less than an inch.

In certain embodiments of the additively manufactured self-destructive delay device, the time delay is less than one second. In certain embodiments of the additively manufactured self-destructive delay device, the time delay is greater than one second.

In some embodiments, the force is less than 10 lbf. In certain embodiments of the additively manufactured self-destructive delay device, the force is greater than 50 lbf.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 3A through FIG. 3G represent equations for a Belleville spring or washer.

DETAILED DESCRIPTION OF THE DISCLOSURE

Figure 1:
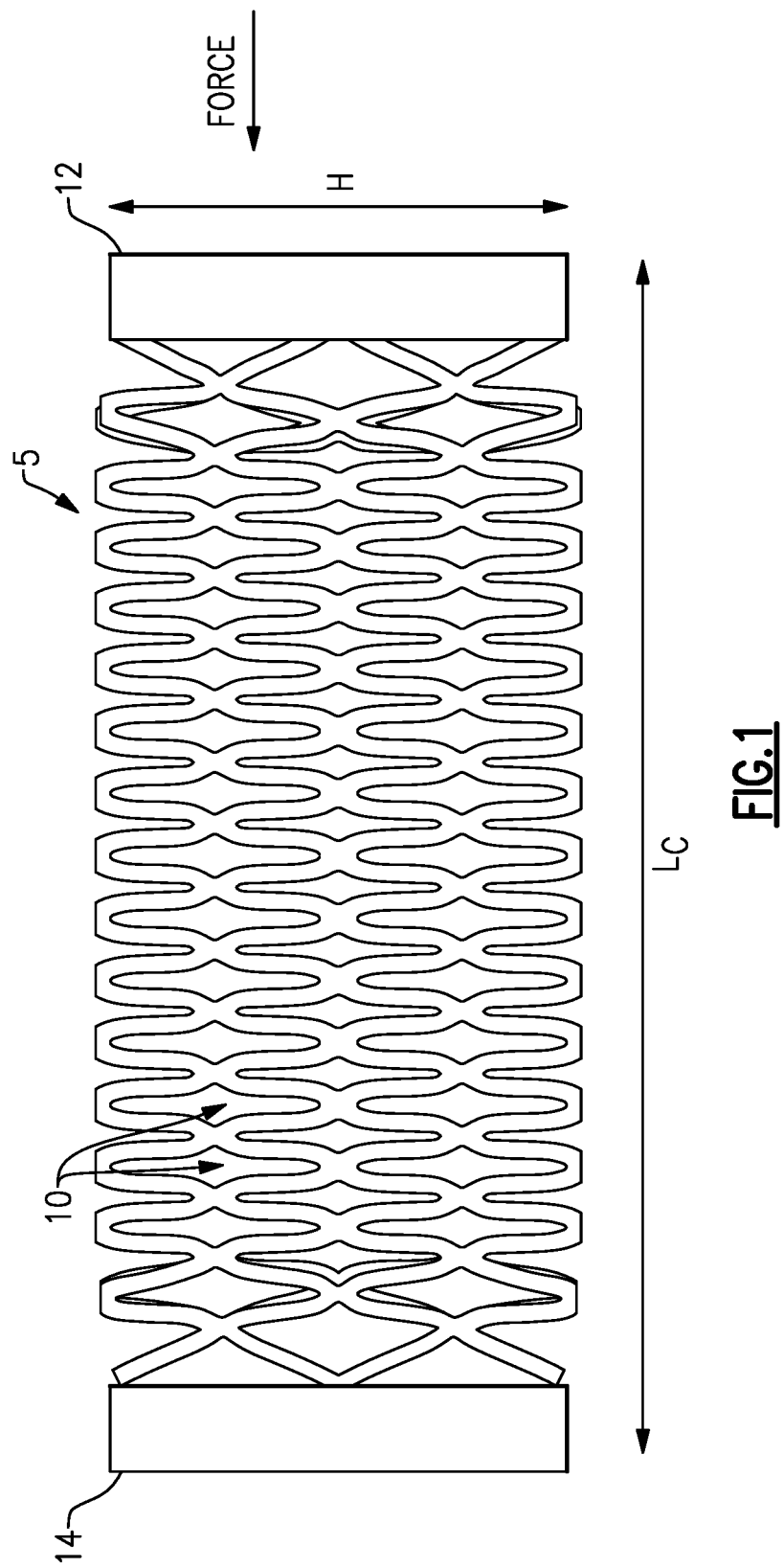
FIG. 1 shows one embodiment of a loaded lattice-type delay unit according to the principles of the present disclosure.

A conventional delay unit, such as in a fin deployment application (e.g., a simple hydraulic piston), typically cannot be replaced at the end of its relatively short lifespan because it is installed early on in the assembly process and any attempt to disassemble and replace the delay unit would damage or destroy the entire system. As a result, once the hydraulic fluid in the delay device reaches the end of its shelf life, the entire system needs to be recalled, scrapped, rebuilt, and replaced at great cost. In this situation, one simple part limits the entire system's lifespan and there are a number of other delay devices with such limitations.

One embodiment of the delay device of the present disclosure is an additively manufactured bellow/lattice type structure for use in a fin deployment application. This additive technology delay device could be incorporated into existing additively manufactured designs or be a separate delay device that can be installed into another existing assembly. In one embodiment, the delay device is installed as a replacement to a previous delay device, where the delay device yields under the deployment force at a specific rate to match the time-displacement curve established by the previous delay device. In certain embodiments, the delay device has a virtually unlimited lifespan, is cheap to manufacture, and can be adaptable to other loads and conditions for use in or on other platforms. This solution can be applied anywhere where mechanical delay devices are needed within systems. Some examples include wing/fin deployment mechanisms, safety crumple zones, fuze settings, or devices that act as shear pins.

The solution of the present disclosure can be adapted to fit an array of performance constraints, such as time, displacement, shock absorbency, yield strength, etc. Certain embodiments of the delay device of the present disclosure are cheap, quick and easy to manufacture, and have a virtually unlimited shelf life compared to a mechanical/hydraulic delay device having equivalent performance requirements. In certain embodiments, the form factor of the device is optimized to achieve different performance requirements for different platforms, from delaying a small drag fin deployment by seconds to absorbing huge amounts of shock from an explosive wing deployment. The form factor may be rectangular, cylindrical, or another shape. The material of the delay device can be adjusted to achieve certain material properties desired, such as the yield strength of the delay device, weight, and survivability. The materials available for additive manufacturing currently are extensive and growing in number and complexity, providing additional ways to fine-tune the finished material properties. Common material choices include aluminum alloys, stainless steel, titanium alloys, nylon composites, as well as engineering-grade plastics and fiber-plastic composites. The present design can utilize any of these materials. The material selection can be tailored to the use case. For example, low force applications would use a weaker material such as nylon and plastics where high force applications would require metals In certain embodiments, the geometry of the device is adjusted to achieve certain performance requirements, such as time, displacement, force, and mechanical action required. For example, a low-force (e.g., less than 10 lbf) time delay device requiring a large time delay (e.g., greater than 1 second) could be made from a lower-strength nylon material in a lattice configuration with a high displacement (e.g., greater than 1 inch) that would yield easily under the resultant low pressure but still provide enough resistance to delay the mechanical motion of the action. A high-force delay (e.g., over 50 lbf) device requiring a small time delay (e.g., less than 1 second) could be a higher strength metal bellow-type device that would yield under the resultant larger pressure over a shorter displacement (e.g., less than 1 inch), more akin to a sacrificial crumple zone.

Figure 5A:
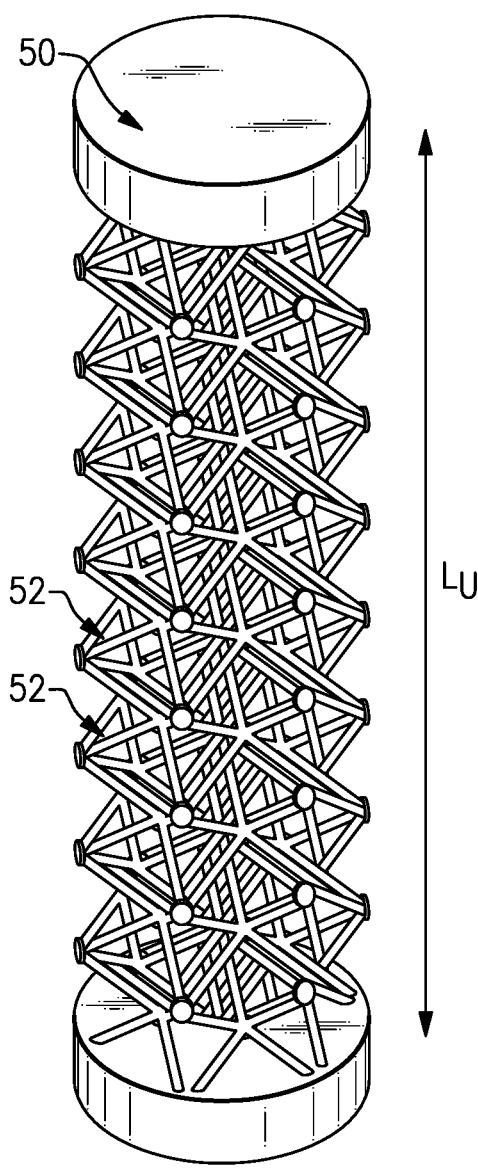
FIG. 5A and FIG. 5B show a structural analysis of one embodiment of a loaded lattice-type delay unit according to the principles of the present disclosure where it is in uncompressed and compressed form, respectively.

In embodiments such as those represented in FIG. 1, FIG. 2, FIG. 5A and FIG. 5B, a lattice cell structure is used to provide a mechanical delay over a larger displacement (e.g., greater than 1 inch). The lattice cell members can be thickened and/or increased to provide more stiffness (and therefore more of a time delay by taking longer to yield fully). The lattice cell geometry can also be changed to fit different form factors, such as rectangular (represented by FIGS. 1 and 2) or cylindrical (represented by FIG. 5A and FIG. 5B.). In certain embodiments, cells could range from 0.125" inch to several inches depending on the application (i.e., for larger forces/displacements larger cells would be beneficial). All figures are examples of 3D lattices. FIGS. 5A and B show a 3 lattice in an isometric view. A 2D lattice would not work for these applications because of buckling.

In one embodiment of the delay device, it is self-destructive. Thus, the device itself self-destructs as it performs the required action. The device is destroyed while achieving a delay such as by absorbing an external force, since it is crunched, broken, or otherwise irreversibly yielded while performing its required action. Conventional bumper crumple zones are an example of a 2.5D lattice (an extruded polygon in one direction). Also, traditional crumple zones are not produced additively within existing part geometry. They are machined, cast, or otherwise installed after the fact.

In certain embodiments of the self-destructive delay device of the present disclosure, the device is modeled as a Belleville washer, or coned-disc spring. A Belleville washer is a conical shell which can be loaded along its axis either statically or dynamically. A Belleville washer is a type of spring shaped like a washer. It is the characteristic frusto-conical shape that gives the washer its characteristic spring qualities. See, e.g., FIG. 4A-FIG. 4C. These figures are a representation of a lattice designed to look and act like a stack of Belleville washers. The washers are joined by a small amount of material but the traditional Belleville force calculations can still be used since the geometry is almost the same. In a spring-stack, disc springs can be stacked in the same or in an alternating orientation and it is possible to stack packets of multiple springs in the same or alternating direction. See, e.g., FIG. 4C. For example, using additive manufacturing, the springs are manufactured such that they form a unitary three dimensional section of springs. Multiple spring sections can be joined together by coupling the peripheral sides of the spring to other sides. Multiple Belleville washers may be stacked to modify the spring constant (or spring rate) or the amount of deflection. Stacking in the same direction will add the spring constant in parallel, creating a stiffer joint (with the same deflection). Stacking in an alternating direction is the same as adding common springs in series, resulting in a lower spring constant and greater deflection. Mixing and matching directions allow a specific spring constant and deflection capacity to be designed.

Generally, if n disc springs are stacked in parallel (facing the same direction), standing the load, the deflection of the whole stack is equal to that of one disc spring divided by n, then, to obtain the same deflection of a single disc spring the load to apply has to be n times that of a single disc spring. On the other hand, if n washers are stacked in series (facing in alternating directions), standing the load, the deflection is equal to n times that of one washer while the load to apply at the whole stack to obtain the same deflection of one disc spring has to be that of a single disc spring divided by n.

It is understood that disc springs have a number of advantageous properties compared to other types of springs, including, but not limited to 1) large loads can be supported with a small installation space, 2) due to the nearly unlimited number of possible combinations of individual disc springs, the characteristic curve and the column length can be further varied within additional limits, 3) high service life under dynamic load if the spring is properly dimensioned, 4) provided the permissible stress is not exceeded, no impermissible relaxation occurs, 5) with suitable arrangement, a large damping (high hysteresis) effect may be achieved, and 6) because the springs are of an annular shape, force transmission is absolutely concentric.

Referring to FIG. 1, one embodiment of a loaded lattice-type delay unit 5 according to the principles of the present disclosure is shown. In this depiction the force has been applied and the lattice structure 5 has been compressed and has caused a time delay. More specifically, a delay unit for a low force delay application that requires a certain amount of displacement/delay time is shown. The members, or cells, of the lattice 10 yield under force, causing the device 5 to compress in on itself as it is compressed. Here the compressed length is referred to as $L_C$, there is a height H and a width W (not shown). The dimensions and material composition of the lattice structure are designed for the particular situation. In one example there is an impact side 12 that is the side in which a force is applied and causes the lattice structure device 5 to compress to the opposing side 14. One embodiment employs additive manufacturing for creating the device 5 that incorporates the design constraints. For example, the lattice structure device 5 is incorporated into the interior of a projectile. The interior dimensions for the space allocated for the delay device 5 of the projectile are the parameters for the additive manufacturing processing. The delay time period required is used to configure the design of the lattice structure device 5. In one example the lattice structure device 5 is a unitary additively manufactured design including the impact side 12 and opposing side 14 end pieces such that the entire unit is slipped into the projectile and occupy the entire volume of the dedicated space.

Figure 2:
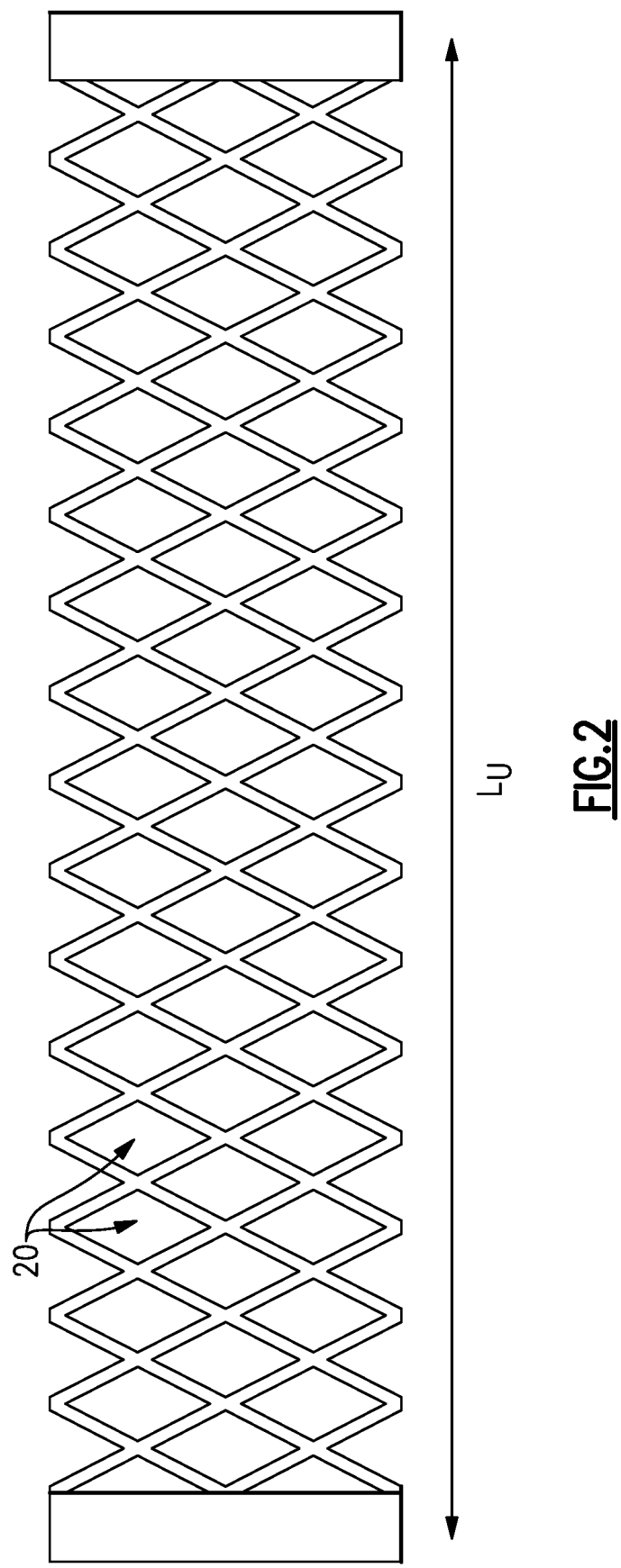
FIG. 2 shows one embodiment of an unloaded lattice-type delay unit according to the principles of the present disclosure.

Referring to FIG. 2, one embodiment of an unloaded lattice-type delay unit according to the principles of the present disclosure as seen in FIG. 1 is shown. The depiction in FIG. 2 is what the installed lattice-type delay unit looks like before activation; before force is applied and yields the structure. Here the unloaded length is referred to as $L_U$. Each of the members, or cells 20, in the lattice are shown in their unloaded form.

Figure 3A:
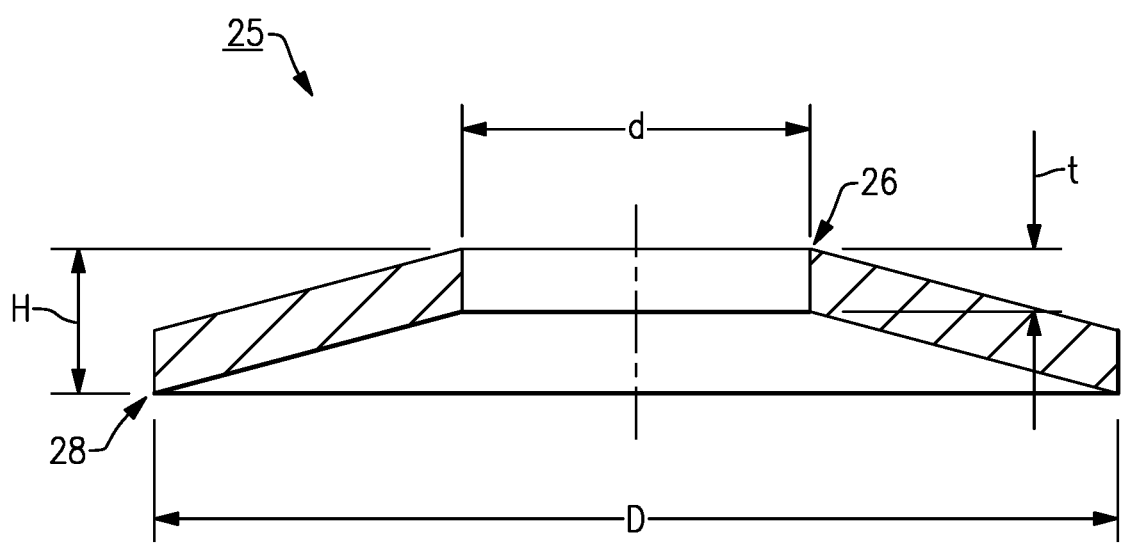

Referring to FIG. 3A, a 2D diagram representing a Belleville spring or washer 25 is shown. A Belleville spring or washer 25 is formed into a conical or cone shaped geometry. The degree of conical shape gives the washer a spring characteristic. They are typically used as springs where the washer/spring is used to apply a preload or a flexible quality to a system. The washer has an inner section 26 and an outer section 28. The spring 25 can be stacked with other springs in parallel (also called nested) or in series (also called inverted) and a combination of both such that there can be one or more springs in parallel followed by one or more springs in series, followed by one or more further springs in parallel or series. When stacked in parallel, they are placed so that nested together while the series stacking places the inner section 26 of one washer in direct contact with the inner section 26 of an adjacent washer.

FIG. 3B shows the equation for the α coefficient. FIG. 3C shows the equation for the β coefficient. FIG. 3D shows the equation for the δ coefficient. FIG. 3E shows the equation for force at maximum spring deflection and limit deflection. FIG. 3F shows the equations for force exerted by the spring at s deflection. FIG. 3G shows the equation for maximum pressure stress in spring at s deflection.

In one embodiment, a calculator uses a Belleville spring configuration. The calculator takes the material properties and spring geometry and calculates the following:

$F_{max}$=force at maximum spring deflection (how much pressure the spring is pressing back once it is completely flattened. Ideally for this application, this number should be low so there is no rebounding of the delay action).

F@s=force exerted by spring at a given deflection (how much force the spring exerts back as its being compressed. This calculation is plotted over the full displacement of the spring to find a maximum force exerted. This calculation is used to reverse-engineer a desired delay time by using the force-displacement curve against the device activation force being applied).

Stress@s=max pressure stress in spring at a given deflection (this is strictly used for analysis purposes).

Calculations for one embodiment of the delay unit are as follows:

| | | | |
|---|---|---|---|
| H | 0.11 | (unloaded spring height) | in |
| t | 0.01 | (spring thickness) | in |
| D | 0.3 | (spring OD) | in |
| d | 0.063 | (spring ID) | in |
| s | 0.015 | (spring deflection) | in |
| h | 0.1 | (unloaded clearance of one spring) | in |
| rho | 4.761904762 | (diameter ratio) | |
| Sm | 0.1 | (spring deflection limit) | in |
| alpha | 0.794227226 | (calculation coefficient) | in |
| beta | 1.726085683 | (calculation coefficient) | in |
| gamma | 2.301835526 | (calculation coefficient) | in |

In this embodiment, the $F_{max}$ calculation was 1.243 lbs where the Young's modulus was 183,000 and Poisson's ratio was 0.42. The F@s calculation with s=0.15 was 15.664 lbs for the same embodiment and the Stress calculation was 37.189 ksi. In another embodiment, the Young's modulus was 10,290,000 and the Poisson's ratio was 0.336 for an AlSi$_{10}$Mg unit.

Figure 4A:
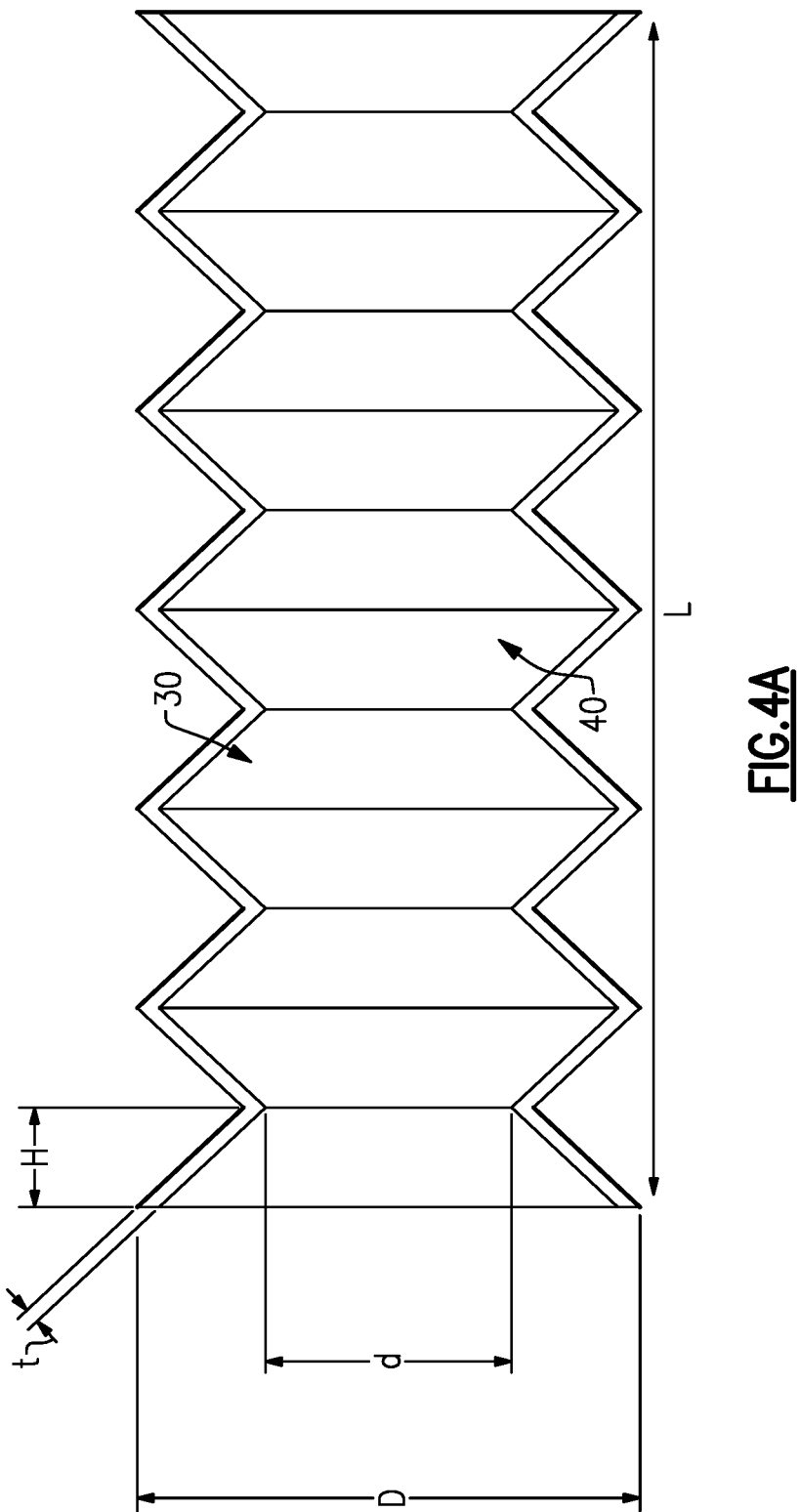
FIG. 4A through FIG. 4C show an embodiment of a bellow type delay unit according to the principles of the present disclosure.
Figure 4B:
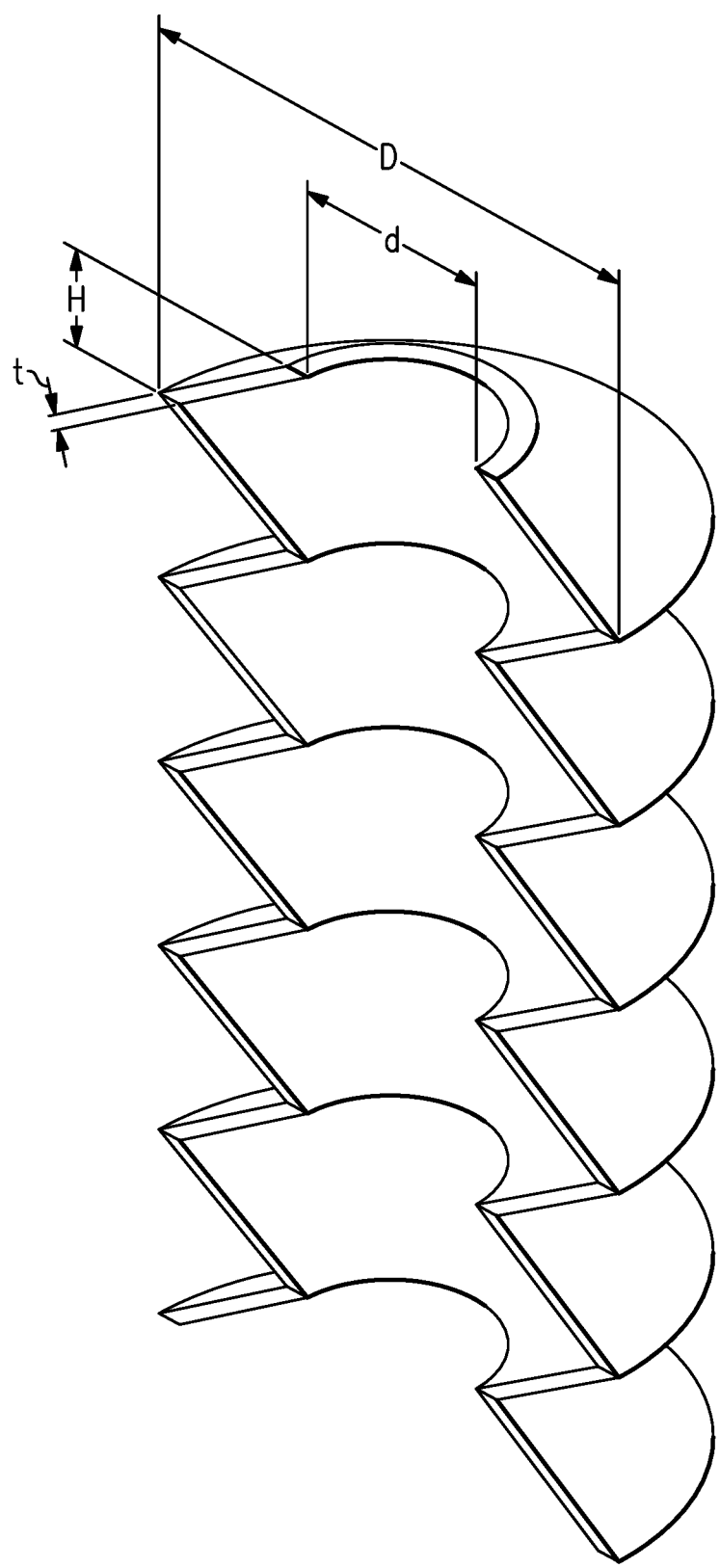
Figure 4C:
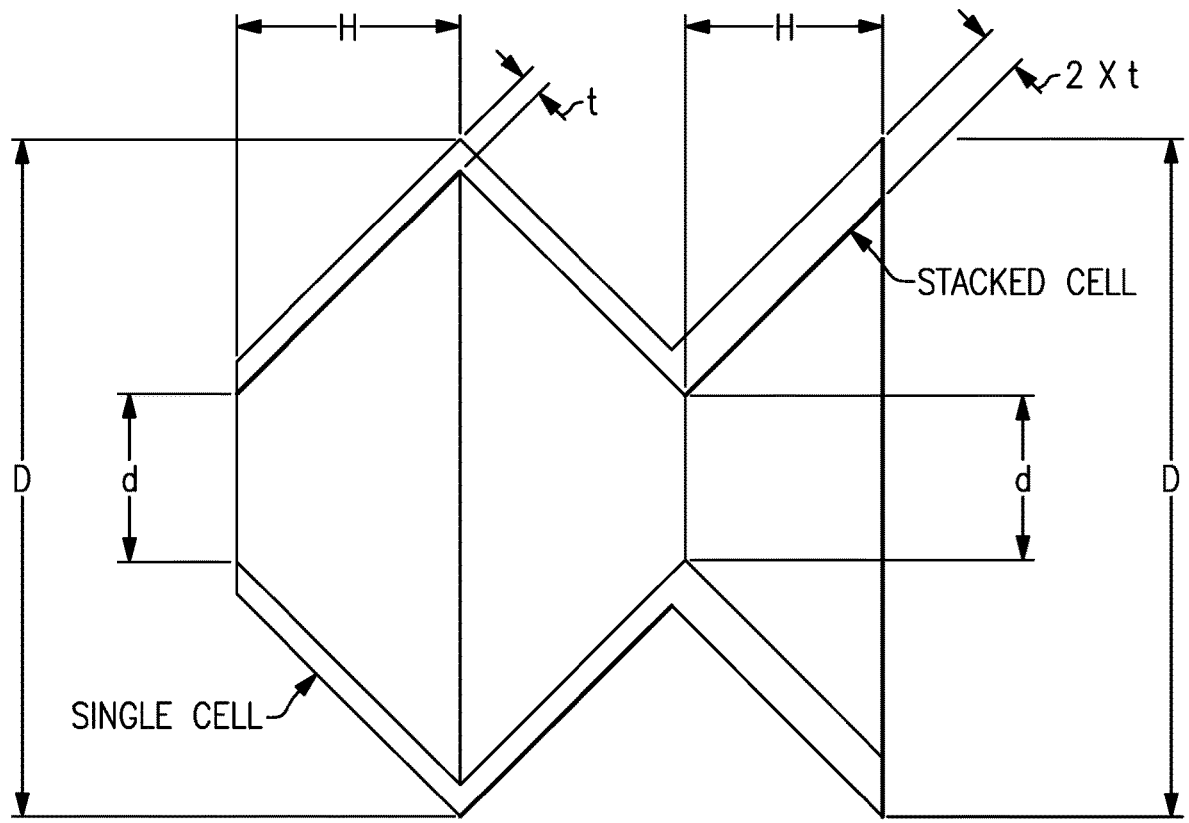

Referring to FIG. 4A-FIG. 4C, one embodiment of a delay unit according to the principles of the present disclosure is shown. More specifically, a bisected cross section of a bellow-type delay unit that compresses in on itself is shown in FIG. 4A. Geometric dimensions that are critical to the force calculation are shown for reference; with D representing the outer diameter in inches, d representing the inner diameter in inches, H representing the height of an individual cell in inches, and t representing the wall thickness in inches. Here, members of the bellow 30, 40 are shown.

Certain embodiments of the delay unit of the present disclosure should survive a variety of situations. More specifically, in one embodiment the delay unit is a single use damper assembly. Prior systems were oil-filled devices used to slow the deployment of a spring actuated mechanism, such as the deployment of a fin on a projectile. The delay unit of the present disclosure has the potential to be exposed to wide temperature ranges, heavy vibration, altitude, varied loads, and must conform to constrained volume and weight requirements, and form factors.

In one embodiment, the delay unit replaced a hydraulic piston and was exposed to temperatures ranges from about −65° C. to about +125° C. In some embodiments, the delay unit may be exposed to 100% humidity, salt, fog, sand, dust, solvent, biological organisms and the like and still maintain performance. In certain embodiments, the delay unit must withstand, without failure or degradation, 600 Gs along the x axis for ½ sine pulse of 8 milliseconds, and 30 Gs along y and z axes for ½ sine pulse of 11 milliseconds, for a plurality of such pulses. In some cases, the delay unit must withstand acceleration of about 15 Gs in both directions in each of the three principal axes.

The delay unit of the present disclosure must also have a specific time delay for the particular purpose. In some cases, the delay unit will activate for loads over 5 lbs and below a maximum of 30 lbs. It is not that the delay unit will not activate above 30 lbs., but rather it is designed and optimized for that load range. Some applications have different spring preloads the device has to hold against before deployment.

In one example, the delay unit may be exposed to a maximum of 70 lbs and minimum force of 56 lbs at the beginning of a stroke (expansion). At the end of the stroke, the delay unit will be about 1.5 inches shorter (e.g., it crumpled) and will be exposed to an applied load of a maximum force of 35 lbs and a minimum force of about 25 lbs. In some cases, the delay unit must have a 10 year minimum storage life without the requirement of refurbishment or reconditioning for operational use. This embodiment is a somewhat of a middle application where according to the principles of the present disclosure the delay unit could be used in a wide range of applications with a wide range of performance characteristics.

Applications for this device could have any combination of the factors listed. The intent of leaving the values variable is to leave the design open to fit different applications where the delay device could be used. In one example, the delay device is located in a drag fin assembly in the rear of the projectile.

One process of making a device is analysis-based rapid prototyping. Iterations of different devices with different geometries and materials are structurally analyzed until the performance is within acceptable limits. Since the devices are cheap to manufacture in large amounts, several sizes/configurations could be manufactured at the same time and then each unit could be tested for a pass/fail determination for the intended application.

In one particular case, a material that would yield given the activation forces of the application is chosen for a particular thickness of a material. A structural analysis is then run to find the displacement, and then the geometry is modified to increase or decrease the displacement, as necessary, to suit the particular use application. Another acceptable development process would be to manufacture an array of devices of the same material with different thickness, geometries, and configurations and put them through destructive testing to manually find out which one meets a particular set of specifications.

Figure 5B:
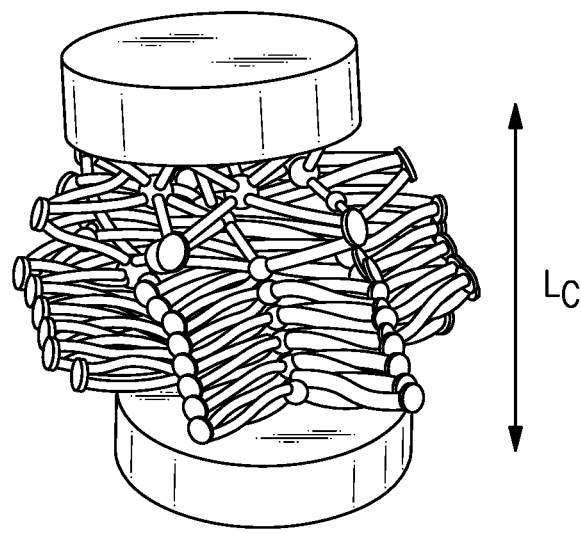

Referring to FIG. 5A, a structural analysis of one embodiment of an un-loaded lattice-type delay unit according to the principles of the present disclosure is shown. More specifically, a low force delay application that requires a large amount of displacement/delay time is shown. The members, or cells 52, of the lattice yield under force, causing the device to compress in on itself, as shown in FIG. 5B. Here, the form factor shown 50 is cylindrical.

Figure 6A:
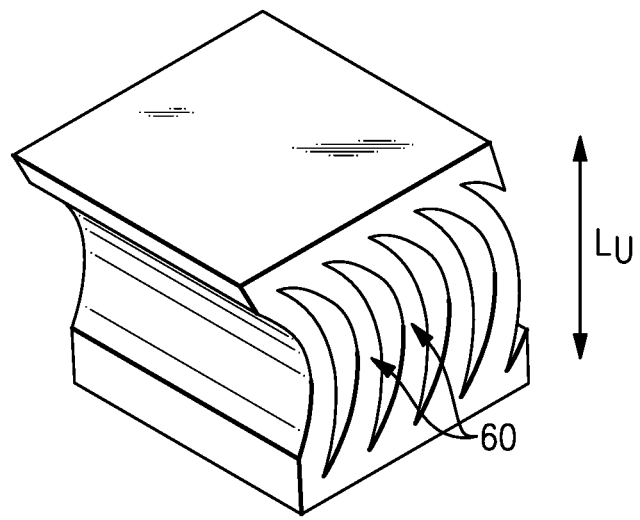
FIG. 6A and FIG. 6B show a structural analysis of one embodiment of a loaded radial cell-type delay unit according to the principles of the present disclosure where it is in uncompressed and compressed form, respectively.
Figure 6B:
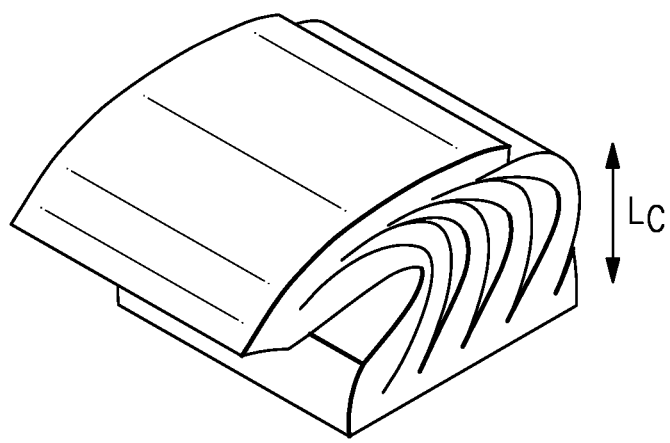

Referring to FIG. 6A, a structural analysis of one embodiment of an un-loaded radial cell-type delay unit according to the principles of the present disclosure is shown. More specifically, a high force delay application that requires a small amount of displacement/delay time is shown. The members of the radial cells yield in the X axis under force, causing the device to compress in the 1 axis, as shown in FIG. 6B. Here, the members, or cell 60, are shown. As noted previously, the unloaded length is shown as $L_U$ and the compressed length is shown as $L_C$.

Figure 7A:
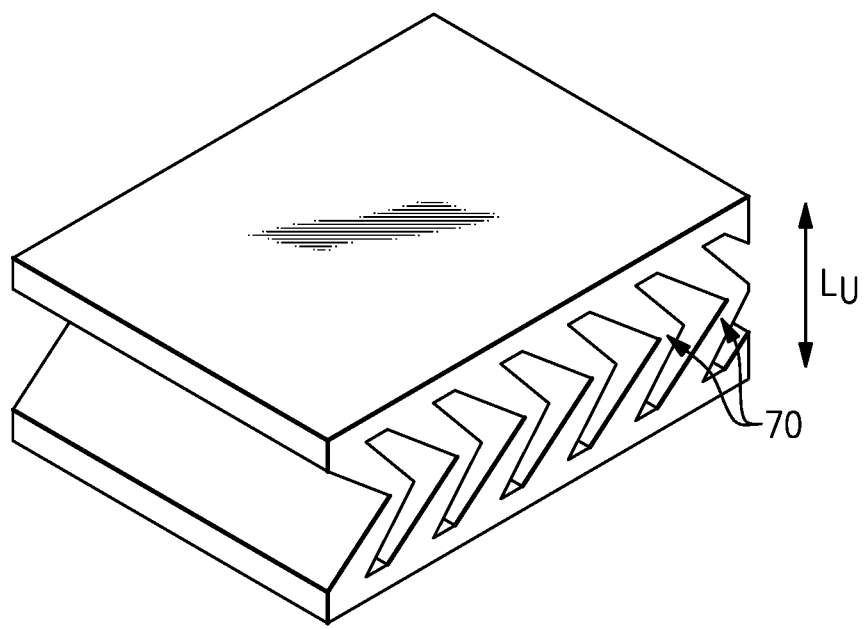
FIG. 7A and FIG. 7B show a structural analysis of one embodiment of a loaded arrow cell-type delay unit according to the principles of the present disclosure where it is in uncompressed and compressed form, respectively.
Figure 7B:
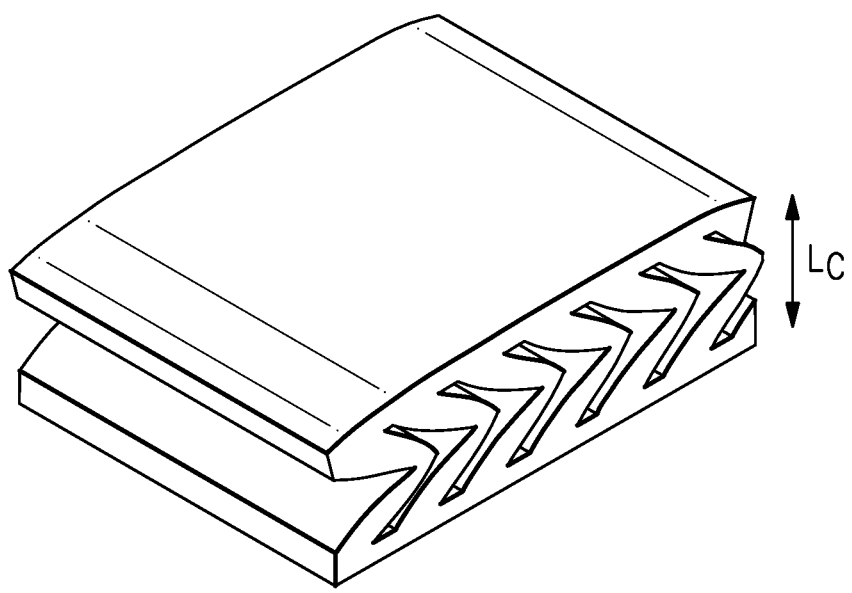

Referring to FIG. 7A, a structural analysis of one embodiment of an un-loaded arrow cell-type delay unit according to the principles of the present disclosure is shown. More specifically, a high force delay application that requires a small amount of displacement/delay time is shown. The members, or cells 70, of the arrow cell-type delay device yield in the X axis under force, causing the device to compress in the Z axis, as shown in FIG. 7B. As noted previously, the unloaded length is shown as $L_U$ and the compressed length is shown as $L_C$.

Figure 8A:
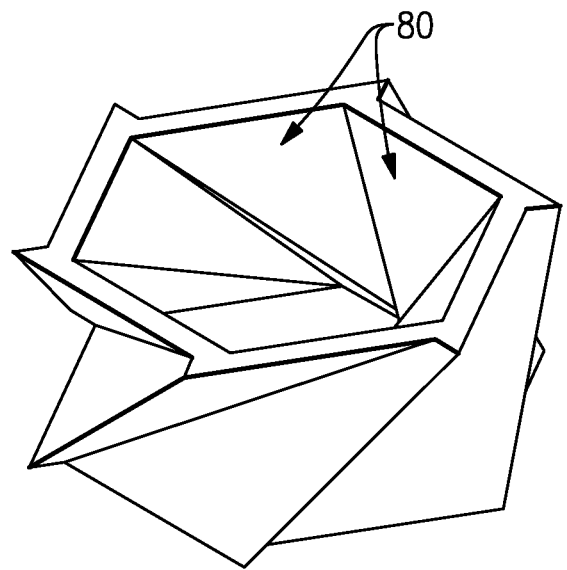
FIG. 8A-FIG. 8D show various views of a structural analysis of one embodiment of a loaded torsion cell-type delay unit according to the principles of the present disclosure where it is in uncompressed and compressed form, as viewed from the side and the top.
Figure 8B:
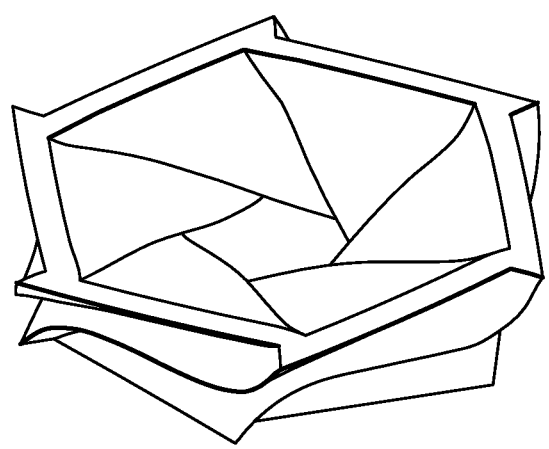
Figure 8C:
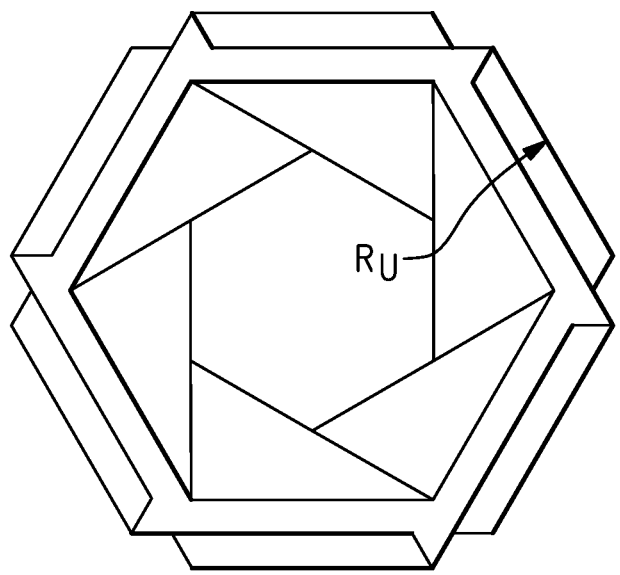
Figure 8D:
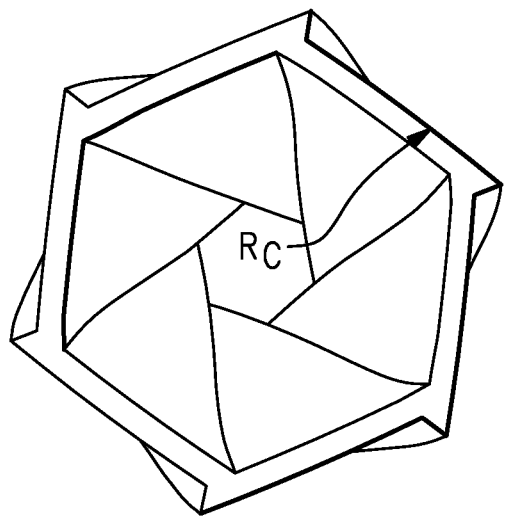

Referring to FIG. 8A, a perspective view of a structural analysis of one embodiment of an un-loaded torsion cell-type delay unit according to the principles of the present disclosure is shown. More specifically, a torsion force delay application that requires radial displacement is shown. The torsion cell yields around the Y axis under force, causing the device to compress in the Y axis, as shown in FIG. 8B and FIG. 8D (i.e., from the top). Referring to FIG. 8C, a top down view of FIG. 8A for reference and for clarity. Here, the cells 80, or members of the torsion cell-type delay unit provide for radial displacement. He unloaded radius is shown as $R_U$ and the compressed radius is shown as $R_C$.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An additively manufactured delay device, comprising:
a plurality of cells forming a unitary coupled structure, wherein the cells have a cell type and the unitary coupled structure is configured to fit within a form factor for a projectile;
a displacement amount within the form factor configured to provide a time delay from a compression of the cells; and
a force under which the delay device will reach the displacement amount and yield the time delay.

2. The additively manufactured delay device according to claim 1, wherein the cell type is one of a lattice cell, an arrow cell, a radial cell, a torsion cell, or a bellow cell.

3. The additively manufactured self-destructive delay device according to claim 1, wherein the form factor is a cylinder or a rectangle.

4. The additively manufactured self-destructive delay device according to claim 1, wherein the displacement is greater than an inch.

5. The additively manufactured self-destructive delay device according to claim 1, wherein the displacement is less than an inch.

6. The additively manufactured self-destructive delay device according to claim 1, wherein the time delay is greater than one second.

7. The additively manufactured self-destructive delay device according to claim 1, wherein the force is greater than 10 lbf.

8. The additively manufactured self-destructive delay device according to claim 1, wherein the force is greater than 50 lbf.

9. The additively manufactured self-destructive delay device according to claim 1, wherein the displacement is radial.

10. The additively manufactured self-destructive delay device according to claim 9, wherein the time delay is less than one second.

11. The additively manufactured self-destructive delay device according to claim 9, wherein the force is less than 10 lbf.

12. The additively manufactured self-destructive delay device according to claim 1, wherein the displacement is linear.

13. The additively manufactured self-destructive delay device according to claim 12, wherein the displacement is greater than an inch.

14. The additively manufactured self-destructive delay device according to claim 12, wherein the displacement is less than an inch.

15. The additively manufactured self-destructive delay device according to claim 12, wherein the time delay is less than one second.

16. The additively manufactured self-destructive delay device according to claim 12, wherein the force is less than 10 lbf.

17. A projectile having a delay device, the delay device comprising:
a plurality of Belleville washers that are configured to fit within the projectile;
a displacement amount within the form factor of the projectile configured to provide a time delay from a compression of the plurality of Belleville washers;
a force under which the delay device will reach the displacement amount and cause an action; and
wherein the delay device is self-destructive.

18. The projectile according to claim 17, wherein the action is deploying one or more fins.

19. The projectile according to claim 17, wherein the Belleville washers are nested, inverted or a combination thereof.

* * * * *